J. B. REPLOGLE.
REGULATING DEVICE FOR DYNAMO ELECTRIC MACHINES.
APPLICATION FILED AUG. 18, 1917.

1,401,492.

Patented Dec. 27, 1921.

INVENTOR
James B Replogle
BY
Kerr Page Cooper & Hayward
ATTORNEYS

UNITED STATES PATENT OFFICE.

JAMES B. REPLOGLE, OF DETROIT, MICHIGAN, ASSIGNOR TO REMY ELECTRIC COMPANY, OF ANDERSON, INDIANA, A CORPORATION OF INDIANA.

REGULATING DEVICE FOR DYNAMO-ELECTRIC MACHINES.

1,401,492.  Specification of Letters Patent.  Patented Dec. 27, 1921.

Application filed August 18, 1917. Serial No. 186,858.

*To all whom it may concern:*

Be it known that I, JAMES B. REPLOGLE, a citizen of the United States, residing at Detroit, county of Wayne, and State of Michigan, have invented certain new and useful Improvements in Regulating Devices for Dynamo-Electric Machines, of which the following is a full, clear, and exact description.

This invention relates to certain new and useful improvements in regulating devices for dynamo electric machines such as are used for charging storage batteries and which are frequently driven at variable speeds. The present regulator is particularly adaptable for use on automobile generators inasmuch as the regulator is adapted to vary the charging rate automatically so as to give higher output in winter than in summer. Other objects and advantages will be pointed out in the accompanying specification and illustrated in the accompanying drawings in which.

Figure 1:
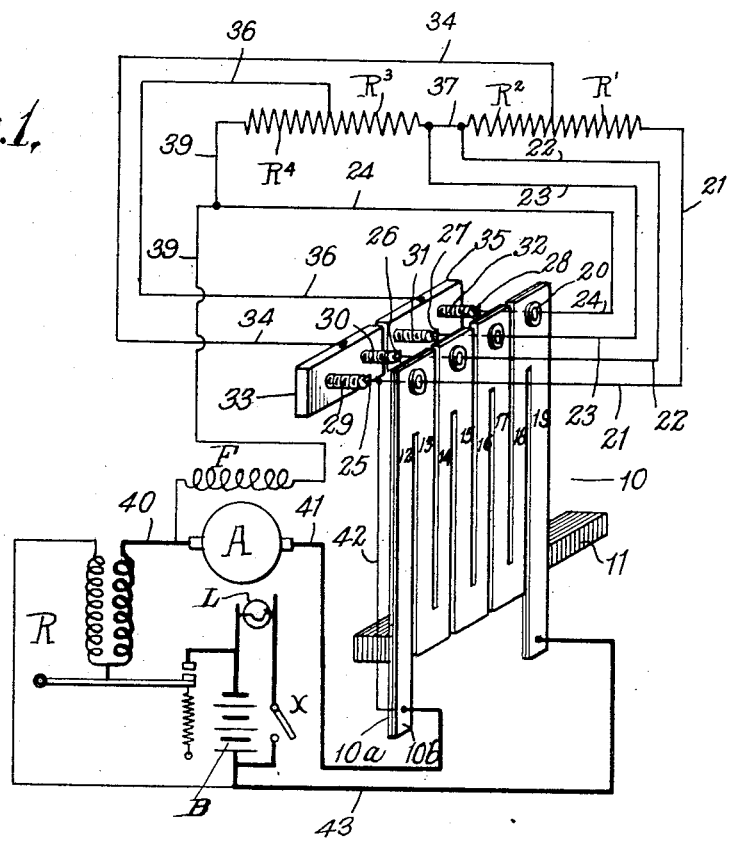
Figure 1 illustrates diagrammatically the preferred embodiment of my invention.

In the drawings A is the armature of a dynamo electric machine here shown as a shunt wound machine having a field F. Other types may be used as well. R is a reverse current relay of the usual form and B is a battery to which the load or translating devices L are connected by a switch X. The regulator comprises a thermostatic device which forms a part of the load or main armature circuit. This device may be placed in heat receiving relation with the machine so that its action is in part controlled by the heat of the machine itself as well as the heat set up by the current flowing from the armature. The thermostat 10 as here shown comprises two strips of metal 10$^a$ and 10$^b$ of dissimilar coefficients of expansion so that the thermostat will bow when heated. The thermostat 10, which is fastened to an insulating strip 11 forming a support, is intersected by a number of slots extending alternately from opposite side edges of said thermostat to form integrally connected and independently movable U-shaped thermostatic portions or blades 12—13, 14—15, 16—17 and 18—19. In the upper ends of each of these blades are insulating bushings 20 which carry wires 21, 22, 23 and 24 leading to contacts 25, 26, 27 and 28 respectively which are supported by blades 12—13, 14—15, 16—17 and 18—19 respectively. These contacts normally are in contact with adjustable contact points, 29, 30, 31 and 32, but as these thermostat blades bow out one or more of these contacts will be separated as will be presently explained. Adjustable contacts 29 and 30 are carried by and electrically connected with a bar 33 with which a wire 34 is connected. Contacts 31 and 32 are likewise associated with a bar 35 to which a wire 36 is connected. Wire 34 taps in between two resistances $R_1$ and $R_2$ and wire 36 taps between two resistances $R_3$ and $R_4$. Wires 22 and 23 connect with wire 37 connecting resistances $R_2$ and $R_3$. $R_1$ connects at its end with wire 21 and resistance $R_4$ connects through wire 39 with wire 24. Wire 39 leads to the field F of the dynamo electric machine. 40 and 41 are the armature leads. The latter lead 41 electrically connects with thermostatic blade 12—13 and has an extension 42 which connects with contact 25. Wire 43 is a main current lead and connects the battery B with thermostat blade 18—19. The main armature and charging circuit traced is as follows. From armature A, wire 40, reverse current relay R, battery B, wire 43, thermostatic blades 19—18, 17—16, 15—14, and 13—12 (in series) wire 41 and back to armature. The normal field circuit (*i. e.* full field strength) without regulating resistance is as follows. From armature A wire 40, field F, wire 39, wire 24, contacts 28—32, bar 35 contacts 31—27 wires 23, 37, 22, contacts 26—30, bar 33, contacts 29—25, wire 42, wire 41 and back to armature. With this condition of circuits the field will be at full strength and the maximum output will be generated in the machine.

As the machine speeds up the current output will increase. The thermostatic blades 12—13 to 18—19 inclusive, which are in series, with the circuit to the battery, will heat up due to the flow of current therein. They will eventually bow so as to open one or more of the contacts carried thereby. It may be here reiterated that the bowing action may be caused conjointly by the heating effect of the current flowing through the blades and the heating effect due to the heat of the dynamo electric machine itself. The bowing of the blades will also be dependent to a certain extent upon the temperature of the air itself so that the bowing will be delayed in the winter and expedited in summer. In this way the current output will be kept higher in winter than in summer. This has been found particularly desirable upon automobiles where the current demand is greater in summer than in winter.

Regulating action.

Suppose thermostatic blades 12—13 have bowed under the heating effect so as to open contacts 29 and 25 and the other blades have not opened their contacts. The field circuit previously traced will be opened at contacts 25 and 29 and will now flow through the circuit previously traced as far as bar 33 then through wire 34 resistance $R^1$, wire 21, wire 42, wire 41 and back to armature. The resistance $R^1$ is now in series with the field F and diminishes the output of the machine. If contacts 29 and 25, 30 and 26 are both open due to the bowing of blades 12—13 and 14—15 the field current can no longer flow through wire 34 and takes a path from bar 35 through contacts 31—27, wire 23, wire 37, resistances $R^2$—$R^1$, wire 21, wire 42, 41 to armature. This inserts resistance $R^2$ and $R^1$ both in series with the field and further reduces the output. With contacts 29—25, 30—26 and 31—27 open the current will flow from bar 35 through wire 36 resistance $R^3$, $R^2$ and $R^1$ and back to armature. With all the contacts open, the field current flows through field F, wire 39, resistances $R^4$, $R^3$, $R^2$ and $R^1$ and back to the armature. It is not believed to be necessary to trace all the combinations of currents. It is here sufficient to state that any one pair of contacts can open first and this contact will insert a certain amount of resistance in the field. The successive opening of the other contacts will insert additional resistance in the field depending upon the number of pairs of contacts which are open. It may be here stated that with the preferred embodiment of my invention as illustrated in Fig. 1 the sequence of contact opening is entirely indeterminate. Any one contact may open first followed by any other contact or contacts and the regulating action will be the same provided the resistances $R^1$ to $R^4$ are equal. By adjusting the contacts by means of the screw adjustment of the parts 29, 30, 21 and 32 and bars 33 and 35 the action of the regulator may be changed.

Figure 2:
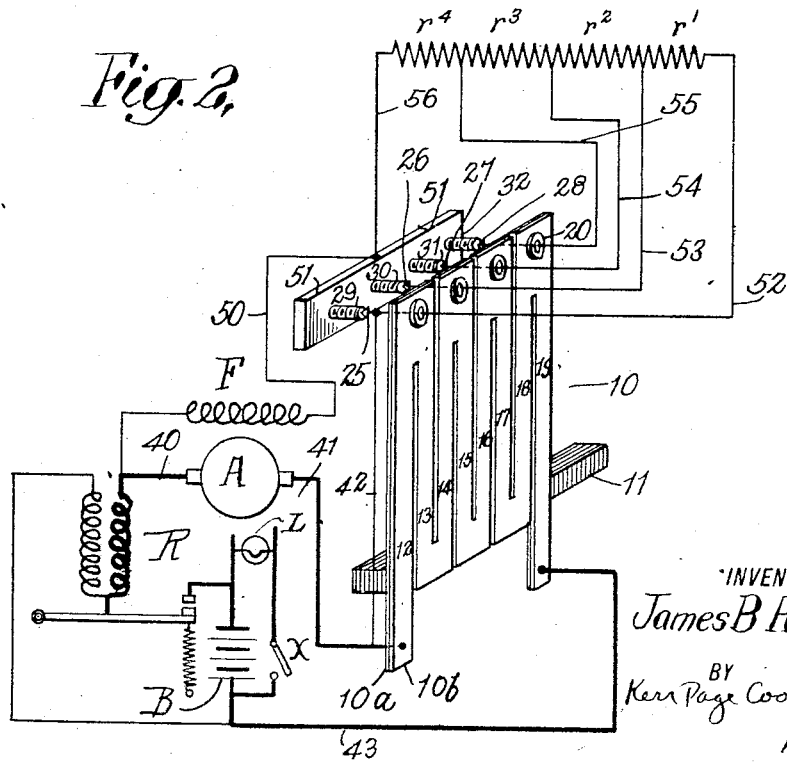
Fig. 2 illustrates a modification in which the cutting in of the regulating resistances is effected in a predetermined sequence.

The construction shown in Fig. 2 will now be described. The main armature or charging circuit through the thermostat is the same as the previously described construction. The normal field circuit (full strength field) is as follows: from armature A wire 40 field F, wire 50, bar 51 contacts 29—25 wire 42, wire 41 and back to armature. Now if contacts 29—25 are open the field current will flow from field F, wire 50, bar 51, contacts 30, 26, wire 53, resistance $r^1$, wire 52, wire 42 and wire 41 back to armature. Here resistance $r^1$ is in the field circuit. If the contacts 30 and 26 are open the field current will flow from bar 51 through contacts 31—27, wire 54, resistance $r^2$, resistance $r^1$, wire 52 and back to armature. Then if contacts 31 and 27 open the field circuit will include the three resistances, $r^1$, $r^2$, and $r^3$. If the contacts are all open it will include the four resistances $r^1$, $r^2$, $r^3$, and $r^4$. In the latter case the current will flow from field F through wires 50 and 56 to resistance $r^4$. With the construction illustrated in this figure the contacts must open in the order mentioned in order to function properly. If the first contacts do not open until the second pair of contacts are open two steps of resistance will be inserted at once. For this reason the first construction is preferable.

It will be understood that my invention is susceptible of various changes and modifications which will be apparent to those skilled in the art. The invention is not to be considered as limited to the precise construction shown in the drawings, which are employed merely for purposes of explanation of the action of the regulator. The regulator is preferably contained in an imperforate casing adjacent the generator and in such relation within the casing that it may receive heat from the generator and may also be cooled by the air circulated by the usual fan. In this way the regulator is made to respond quickly to changes in generator conditions and charging current values.

What I claim as my invention is more particularly pointed out in the appended claims.

I claim:—

1. A regulator for dynamo-electric machines including a plurality of regulating circuits adapted to be placed in regulating relation to the machine, a plurality of independently operable switches for rendering said circuits respectively operative and thermostatic means responsive to the output of the machine and including a series of integrally connected U-shaped thermostat blades for independently actuating said devices.

2. A regulator for dynamo-electric machines including a plurality of regulating circuits adapted to be placed in regulating relation to the machine, a plurality of independently operable switches for rendering said circuits respectively operative and thermostatic means arranged to be heated by current from the dynamo and including a series of integrally connected U-shaped thermostat blades connected in series with the dynamo armature for independently actuating said devices.

3. A regulator for dynamo-electric machines including a plurality of resistances adapted to be placed in regulating relation with the field circuit of the machine, a plurality of independently operable switches for respectively controlling said circuits, and a thermostat device connected with the dynamo so as to be heated in accordance with the output thereof, said thermostat including a series of integrally connected U-shaped thermostat blades connected in series with the dynamo armature for independently operating said switches.

4. A regulator for dynamo-electric-machines including a plurality of resistances adapted to be placed in regulating relation with the field circuit of the machine, a plurality of independently operable switches for respectively controlling said circuits, and a thermostatic device connected with the dynamo so as to be heated in accordance with the output thereof, said thermostat including a series of integrally connected U-shaped thermostat blades each carrying a contact of one of said switches.

5. A regulator for dynamo-electric-machines including a plurality of resistances adapted to be placed in regulating relation with the field circuit of the machine, a plurality of independently operable switches for respectively controlling said circuits, and a thermostatic device connected with the dynamo so as to be heated in accordance with the output thereof, said thermostat including a series of integrally connected U-shaped thermostat blades each carrying a contact of one of said switches, said blades being all connected together in series with the dynamo armature.

6. A regulator for dynamo electric machines, comprising a bimetallic thermostatic device including a plurality of independently movable portions, through which the current delivered by the machine is adapted to pass in series, a series of contacts arranged to be actuated by said movable portions, coöperating contacts therefor, a plurality of resistances connected with said contacts, said thermostatic portions being adapted respectively to open the contacts and thereby insert said resistances in series with the field circuit of the machine to regulate the output thereof.

7. A regulator for dynamo-electric machines, comprising a plurality of regulating circuits adapted to be placed in regulating relation to the machine, a single thermostat device including a plurality of portions all connected together in series with the dynamo armature and movable independently in response to the output of the machine, and a plurality of switch elements arranged to be actuated respectively by said movable portions irrespective of any predetermined order to render said circuits successively operative.

8. A regulator for dynamo-electric machines, comprising a plurality of regulating circuits adapted to be placed in regulating relation to the machine, a single thermostat device including a plurality of portions all connected together in series with the dynamo armature and movable independently in response to the output of the machine, and means actuated respectively by said thermostat portions for rendering said regulating circuits successively operative.

In testimony whereof I affix my signature.

JAMES B. REPLOGLE.